United States Patent [19]

Chaplin

[11] Patent Number: 4,506,618
[45] Date of Patent: Mar. 26, 1985

[54] PROPELLER AND KEEL ARRANGEMENT FOR SURFACE EFFECT SHIPS

[75] Inventor: John B. Chaplin, Covington, La.
[73] Assignee: Textron, Inc., Providence, R.I.
[21] Appl. No.: 624,370
[22] Filed: Jun. 25, 1984

Related U.S. Application Data

[63] Continuation of Ser. No. 440,943, Nov. 12, 1982, abandoned.

[51] Int. Cl.³ .............................................. B63B 1/38
[52] U.S. Cl. .................................... 114/67 A; 180/126
[58] Field of Search ............... 114/67 A, 283; 440/68, 440/69; 180/116, 122, 126, 129

[56] References Cited

U.S. PATENT DOCUMENTS 3,548,776 12/1970 Ford .................................. 114/67 A
3,793,980 2/1974 Sherman ............................... 440/69

FOREIGN PATENT DOCUMENTS 1323220 2/1963 France ................................ 114/67 A Primary Examiner—Trygve M. Blix
Assistant Examiner—Jesûs D. Sotelo
Attorney, Agent, or Firm—Bean, Kauffman & Bean

[57] ABSTRACT

There is disclosed an improved air cushion supported vehicle of the relatively high speed operating "surface effect ship" type, having a main hull and a pair of rigidly constructed opposite side walls or hulls depending therefrom, and bow and stern air cushion sealing means. Each of the side hulls terminates at its lower extremity into an outwardly side-wise canted water planing bottom surface or keel into which one or more non-coplanar surface discontinuities is/are provided for locally accommodating in slightly recessed relation therein the ship propulsion propellers. The configurations of said discontinuities are such as to reduce the requisite angles of the propeller driving shafts relative to the ship hull; thereby reducing the ship draft (propeller clearance) requirements, while also providing under high speed operating conditions improved propeller operating efficiencies and substantial maintenance of the desired air cushion sealing efficiencies of the side hull keels of the ship. Adjacent the stern end of the ship, the keel surfaces are also configured in accordance with the invention, so as to cooperate with the ship air cushion stern seal in such manner as to further improve the overall efficiencies of the ship propelling and air cushion supporting systems.

4 Claims, 9 Drawing Figures

PROPELLER AND KEEL ARRANGEMENT FOR SURFACE EFFECT SHIPS

This is a continuation of application Ser. No. 440,943, filed Nov. 12, 1982, now abandoned.

BACKGROUND OF THE INVENTION

The invention relates to surface effect ships such as are hereinafter referred to as "S.E.S.", and which typically include a main hull structure having rigidly depending and longitudinally extending side walls (or "side hulls") extending downwardly from opposite sides thereof. Thus, there is defined therebetween a tunnel or chamber of inverted U-shaped sectional form into which pressurized fluid (air) for "cushioning" the hull of the ship relative to the water line is supplied so that only the lower extremities of the side walls thereof remain in contact with the water for air cushion sealing purposes. Suitable flexible bow and stern seal devices are provided at opposite ends of the ship between the side walls thereof, so as to control leakages therefrom of the cushioning support fluid.

Propulsion for such a ship is typically furnished by means of fully submerged propellers carried by drive shafts inclining downwardly from the planing "keels" of the side walls thereof; said drive shafts being in side view inclined in acute angled relationships with said keels. In order to obtain adequate propeller performance efficiencies, the angles between the propeller shafts and the bottom surfaces of the keels are typically made overlarge in order to sufficiently "clear" the propellers from the keels. However, such overlarge propeller shaft inclination arrangements contribute to excessive ship "draft" or "bottom clearance" problems; and compromises therewith lead to less than suitable propeller operating efficiencies.

SUMMARY OF THE INVENTION

The present invention provides in an air cushion supported vehicle of the surface effect ship type an improved side wall keel configuration which permits the ship driving units (such as propellers) to be associated with the keels thereof in such manner as to minimize the overall draft requirements of the ship. At the same time the invention provides under high speed operating conditions improved ship propelling hydrodynamic thrust flow patterns throughout the propeller operating environments which substantially maintain the integrity of the ship air cushion support system. The invention also reduces propeller shaft vibration problems.

The characteristic feature of the present invention is to provide in a S.E.S. an improved keel construction including specifically configured local cut-aways into the normally longitudinally planar-continuous bottom planing surfaces of the side wall keels thereof. The design is such as to accommodate the propeller-generated "bores" or envelopes of accelerated water in such a manner as to assist towards maintaining the overall cushion sealing performance of the keels. Concomitantly therewith the invention permits the propeller drive shafts to be inclined downwardly from the ship side walls at significantly reduced angles. Therefore, while propeller draft requirements and shaft vibration problems are thereby decreased, propeller efficiencies are also maintained. Furthermore, and quite importantly, by virtue of the present invention the requisite ship roll stabilizing and air cushion lift preserving functions of the planing keel surfaces of the side wall structures of the ship are virtually unaffected.

DETAILED DESCRIPTION OF THE PREFERRED EMBODIMENTS OF THE INVENTION

Figure 1:
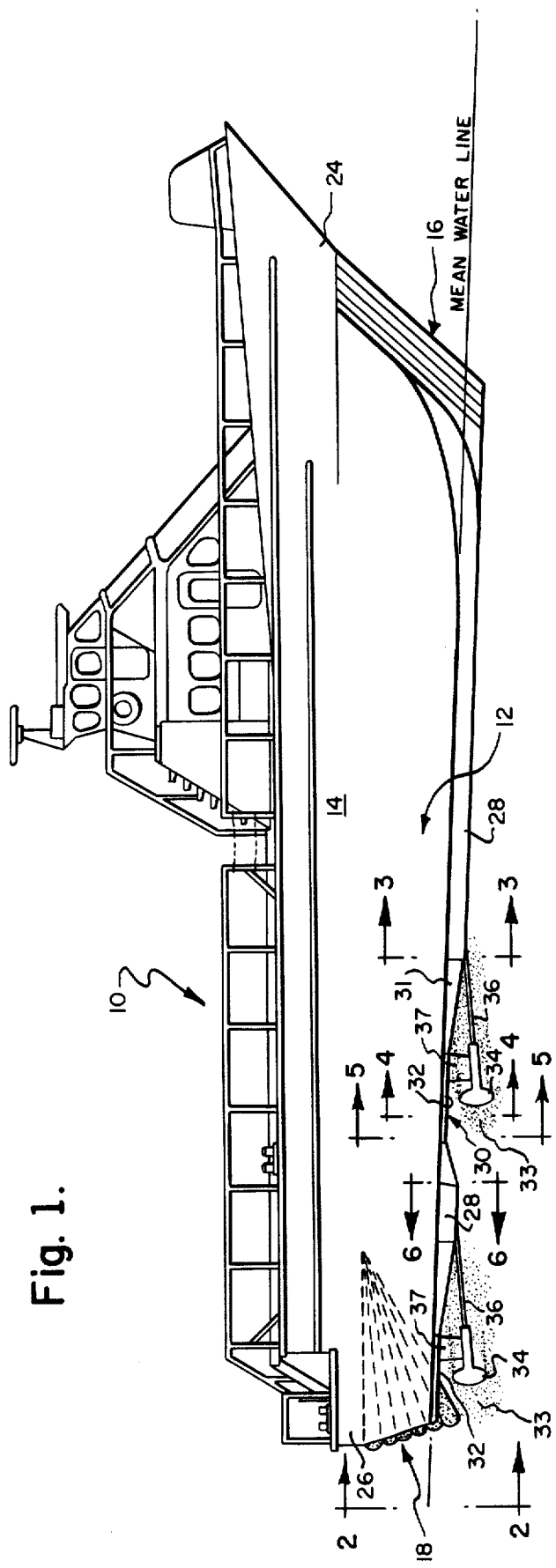
FIG. 1 is a side elevational view of a surface effect ship incorporating one form of the improved keel construction of the present invention.

As shown in the drawings herewith, a S.E.S. of typical construction is generally depicted at 10, and includes a pair of symmetrically opposed side walls 12—12. By way of example, U.S. Pat. No. 4,090,459 also discloses the general conformations of such ships. Thus, the side walls 12—12 thereof depend downwardly from a main hull or "wet deck" portion 14 as shown herein. Side walls 12—12 and hull 14 cooperate to define an inverted U-shaped tunnel or chamber extending longitudinally from the bow of the vehicle to its stern, which in combination with suitable bow and stern air seal devices spanning the side hulls confine the cushioning fluid thereunder to provide lift for the ship in well knwn manner. Such a bow sealing device is schematically illustrated at 16 and any suitable stern sealing device such as shown at 18 may also be employed.

As best shown herein at FIGS. 3–8, each of the side walls 12—12 comprises an inner surface 20 and an outer surface or "strake" 22; both of which surfaces extend longitudinally from adjacent the bow section 24 of the ship to adjacent the stern section 26 thereof. Surfaces 20 and 22 are integrally connected at their lower extremities by "keel" or planing surfaces which are generally depicted at 28 and which are longitudinally substantially coextensive with the side walls. More specifically, the planing surfaces 28 transversely incline downwardly and inwardly from the strakes 22 towards the chines 29 at the lower extremities of the inner side wall surfaces 20 in order to improve air cushion leakage control as well as ship roll control.

In accordance with the present invention, uniquely configured discontinuities or cavity structures are also formed in the planing surfaces 28 of the side wall keels as are indicated generally at 30. In the embodiment illustrated in FIGS. 1–5, these local discontinuities comprise intersecting non-coplanar surfaces 31–32; the surfaces 32 being rearwardly spaced from surfaces 31. Each surface 31 provides a ramp type surface that extends upwardly from its planing edge and merges into a surface 32. As best shown at FIGS. 1, 3, 4, 5, 7, 8 and 9, the strakes 22 and the chines 29 in the regions of the propellers 34 are located at higher elevations relative to the hull. The arrangement is such that the relief surfaces 31 and 32 thereupon cooperate in each case to define a recess into which is partially received and partially enclosed the accelerated pressurized water "bore" such as is designated 33 in the drawing herewith and which is generated by operation of the propellers 34 such as are driven by shafts 36. Intermediate shaft support pylons may of course be employed as shown at 37 if desired, as known in the art, in order to help minimize shaft vibration problems.

It is to be particularly noted that the drive shafts 36 carrying the propellers 34 may be thus arranged to incline downwardly and rearwardly from the ship keels at a substantially reduced angle while still operating at top efficiency. Therefore, the "draft" requirements of the propellers 34 below the hull bottom line are significantly reduced. Furthermore, the locally pressurized and accelerated "bore" 33 of water which is generated by the propeller within the keel "discontinuity" functions to help maintain the desired barrier against ship support cushioning air escape from under the keel.

Figure 9:
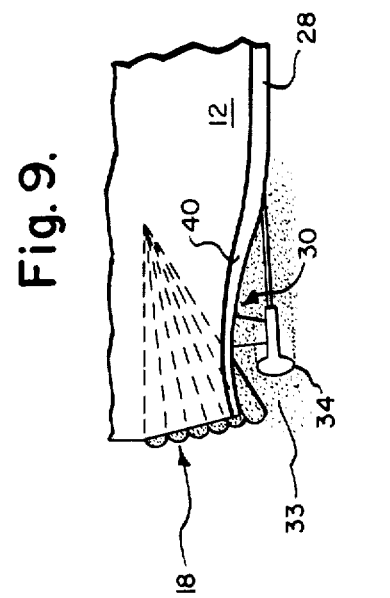
FIG. 9 corresponds to a portion of FIG. 1 but shows how another longitudinal profile of the ship's keels may be employed.
Figure 2:
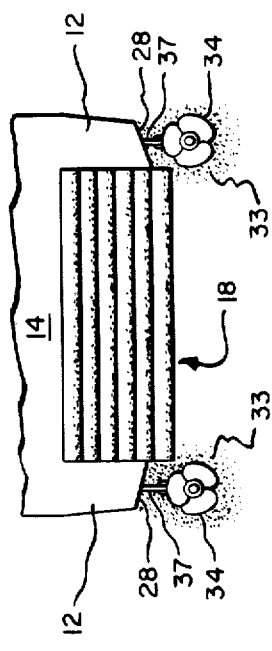
FIG. 2 is a fragmentary, stern end elevational view of the ship of FIG. 1.
Figure 3:
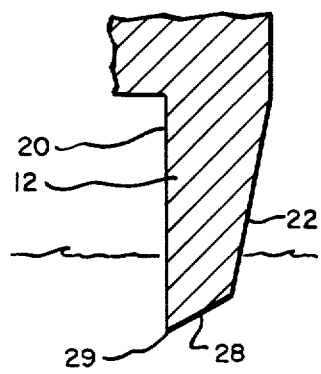
FIGS. 3–6 are enlarged scale fragmentary sectional views taken as along the corresponding sectional indicating lines of FIG. 1.
Figure 4:
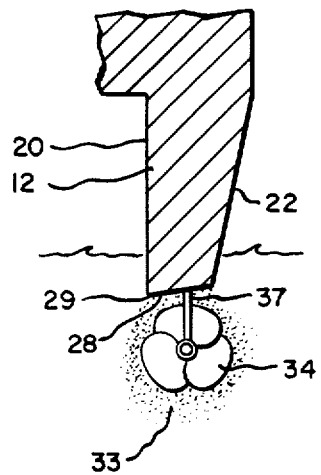
Figure 5:
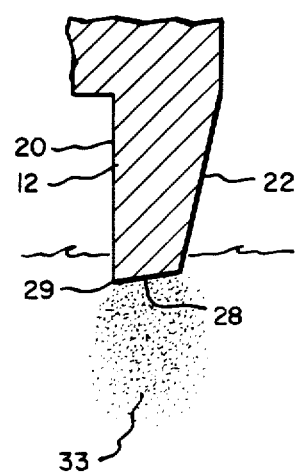
Figure 6:
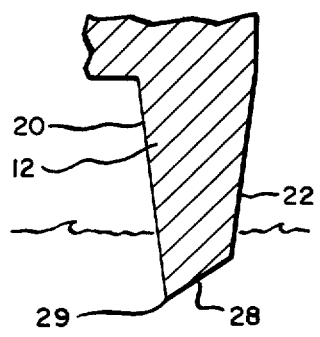
Figure 7:
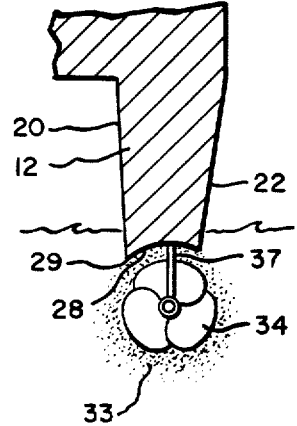
FIGS. 7 and 8 correspond to FIGS. 4 and 5 respectively, but illustrate how in accordance with the invention still another sectional configuration of the discontinuities may be provided in the planing surfaces of the side hull keel structures for accommodating the ship propellers.
Figure 8:
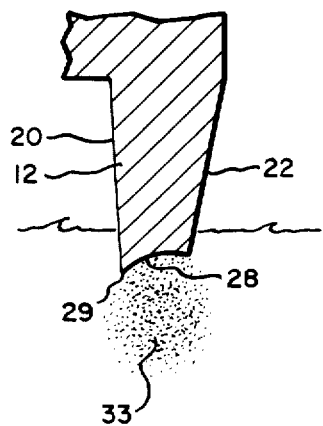

Whereas in FIGS. 1 and 2 the local discontinuities in the planing surfaces thereof are shown as being in the form of successive, angularly related, and substantially flat surfaces, the invention may alternatively employ longitudinally interrelated curved surfaces. Such a composite configuration is shown in FIG. 9; the discontinuities thereof within which the propeller is accommodated being defined by curvilinear merging surfaces 40. In still another preferred form of the invention, the cross-sectional bottom profiles of the keel surfaces 28 are curvilinear, such as are depicted at FIGS. 7 and 8. These configurations operate in similar manner to provide an efficient propeller-bore cooperating air cushion sealing effect under the keel.

By again referring to the drawings, it will be understood that in all forms of the present invention, cavity structures 30 extend downwardly and inwardly from strakes or outer surfaces 22 towards chines 29 at inner surfaces 20 at higher elevations relative to the hull side walls than planing surfaces 28, such that the chines within the area of the cavity structures are raised above or elevated relative to the chines of the planing surfaces. Thus, there is created within the areas of the cavity structures localized channels or passages through which cushion air may escape transversely beneath side walls 12. However, escape of such cushion air is countered or opposed by the placement of propellers 34 within the cavities 30 and the high speed operation thereof to create locally pressurized and accelerated bores 33, as explained above.

What is claimed is:

1. In a propeller driven surface effect ship having a hull and air cushion sealing side walls extending downwardly from opposite sides thereof, said side walls terminating in keel planing surfaces inclined downwardly and inwardly from outer surfaces of said side walls towards chines at lower extremities of inner surfaces of said side walls, the improvement comprising:
propeller draft reducing means comprising cavity structures in said planing surfaces in which the propellers for driving the ship are partially accommodated, said cavity structures extending downwardly and inwardly from said outer surfaces towards chines at said inner surfaces at higher elevations relative to said hull than said planing surfaces, whereby creating a localized channel permitting escape of cushion air transversely of said side walls;
said propellers partially extending below said planing surfaces and being so positioned relative to said cavity structures in said keel planing surfaces as to generate accelerated water-flow bore effects within said cavity structures operating under high speed operating conditions to counter said escape of cushion air from beneath said chines of said cavity structures while reducing the draft requirements of said propellers of said ship.

2. A surface effect ship as set forth in claim 1 wherein said planing surfaces are flat and wherein said cavity structures comprise intersecting non-coplanar flat surfaces.

3. A surface effect ship as set forth in claim 1 wherein the surfaces of said cavity structures are sectionally concave and longitudinally curvilinear.

4. In an air cushion supported vehicle of the surface effect ship type having a main hull and longitudinally extending rigid side walls depending downwardly from opposite sides of said main hull wherein each of said side walls is defined by outer and inner surfaces and a generally continuous longitudinally extending bottom planing surface transversely connecting the lower extremities of said inner and outer surfaces, thereby comprising the side wall keels of said ship; the improvement comprising:
each of said planing surfaces being generally canted in upwardly outboard direction relative to the longitudinal configuration of said ship and having a localized, vertically and horizontally profile-recessing planar discontinuity therein, whereby each said discontinuity creates a localized channel permitting escape of cushion air transversely of its associated one of said side walls;
a propeller drive shaft extending from and blow and in acute-angled relation with each of said planing surfaces; and
propellers keyed to said shafts, said propellers partially extending below said planing surfaces and positioned one within each of said discontinuities so as to operate efficiently in hydrodynamic association therewith while generating throughout said discontinuities under high speed operating condition accelerated water-flow bore effects operating to counter escape of cushion air from beneath said hull by way of said discontinuities.

* * * * *

UNITED STATES PATENT AND TRADEMARK OFFICE
CERTIFICATE OF CORRECTION

PATENT NO. : 4,506,618

DATED : March 26, 1985

INVENTOR(S) : John B. Chaplin

It is certified that error appears in the above–identified patent and that said Letters Patent are hereby corrected as shown below:

Col. 4, line 47 - "blow" should be --- below ---.

Signed and Sealed this

Sixteenth Day of July 1985

[SEAL]

Attest:

DONALD J. QUIGG

*Attesting Officer*   Acting Commissioner of Patents and Trademarks